United States Patent
Seo

(10) Patent No.: US 10,237,837 B2
(45) Date of Patent: Mar. 19, 2019

(54) METHOD FOR TRANSMITTING SYNCHRONIZATION SIGNAL FOR DEVICE-TO-DEVICE COMMUNICATION IN WIRELESS COMMUNICATION SYSTEM AND APPARATUS THEREFOR

(71) Applicant: LG ELECTRONICS INC., Seoul (KR)

(72) Inventor: Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 51 days.

(21) Appl. No.: 15/327,586

(22) PCT Filed: Oct. 7, 2015

(86) PCT No.: PCT/KR2015/010605
§ 371 (c)(1),
(2) Date: Jan. 19, 2017

(87) PCT Pub. No.: WO2016/056843
PCT Pub. Date: Apr. 14, 2016

(65) Prior Publication Data
US 2017/0188319 A1 Jun. 29, 2017

Related U.S. Application Data

(60) Provisional application No. 62/061,084, filed on Oct. 7, 2014.

(51) Int. Cl.
*H04W 56/00* (2009.01)
*H04W 48/16* (2009.01)
(Continued)

(52) U.S. Cl.
CPC ............ *H04W 56/001* (2013.01); *H04L 5/005* (2013.01); *H04L 5/0053* (2013.01); *H04W 8/005* (2013.01);
(Continued)

(58) Field of Classification Search
None
See application file for complete search history.

(56) References Cited

U.S. PATENT DOCUMENTS 9,232,520 B2* 1/2016 Lee .................. H04L 5/0042
9,750,044 B2* 8/2017 Xu .................... H04W 72/1273
(Continued)

FOREIGN PATENT DOCUMENTS

EP 3163953 A1 5/2017
WO WO 2014/142623 A1 9/2014

OTHER PUBLICATIONS

Catt, "Considerations on D2D synchronization procedure", 3GPP TSG RAN WG1 Meeting #78, R1-142895, Dresden, Germany, Aug. 18-22, 2014, 4 pages.
(Continued)

*Primary Examiner* — Candal Elpenord
(74) *Attorney, Agent, or Firm* — Birch, Stewart, Kolasch & Birch, LLP

(57) ABSTRACT

The present invention relates to a wireless communication system, more particularly, to a method for transmitting and receiving a synchronization signal by a transmission terminal in a wireless communication system supporting device-to-device (D2D) communication. A method for transmitting a synchronization signal according to an embodiment of the present invention comprises the steps of: mapping a first synchronization signal for a discovery signal to a first sub-frame and transmitting the first synchronization signal in the first sub-frame; mapping a second synchronization
(Continued)

(a) synchronization signal for D2D discovery signal

P: PSSS for D2D discovery signal
S: SSSS for D2D discovery signal (b) synchronization signal for D2D communication signal

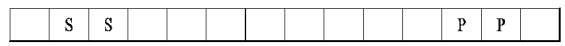

P: PSSS for D2D communication signal
S: SSSS for D2D communication signal signal for a communication signal to a second sub-frame and transmitting the second synchronization signal in the second sub-frame, Herein, the first synchronization signal and the second synchronization signal can be distinguished on the basis of the mapped symbol position or sequence in the sub-frame.

8 Claims, 13 Drawing Sheets

(51) Int. Cl.
<table>
<tr><td>H04W 72/04</td><td>(2009.01)</td></tr>
<tr><td>H04W 88/02</td><td>(2009.01)</td></tr>
<tr><td>H04L 5/00</td><td>(2006.01)</td></tr>
<tr><td>H04W 8/00</td><td>(2009.01)</td></tr>
<tr><td>H04W 76/14</td><td>(2018.01)</td></tr>
<tr><td>H04B 7/26</td><td>(2006.01)</td></tr>
<tr><td>H04L 27/26</td><td>(2006.01)</td></tr>
</table>

(52) U.S. Cl.
CPC ........... *H04W 48/16* (2013.01); *H04W 56/00* (2013.01); *H04W 56/0015* (2013.01); *H04W 72/0446* (2013.01); *H04W 76/14* (2018.02); *H04W 88/02* (2013.01); *H04B 7/2656* (2013.01); *H04L 5/001* (2013.01); *H04L 27/2613* (2013.01); *H04L 27/2655* (2013.01)

(56) References Cited

U.S. PATENT DOCUMENTS

<table>
<tr><td>2014/0323126 A1*</td><td>10/2014</td><td>Ro</td><td>H04W 8/005<br>455/434</td></tr>
<tr><td>2015/0080040 A1*</td><td>3/2015</td><td>Chang</td><td>H04W 48/16<br>455/500</td></tr>
<tr><td>2015/0092655 A1*</td><td>4/2015</td><td>Liao</td><td>H04J 11/005<br>370/312</td></tr>
<tr><td>2015/0124579 A1*</td><td>5/2015</td><td>Sartori</td><td>H04J 11/00<br>370/210</td></tr>
<tr><td>2017/0135054 A1*</td><td>5/2017</td><td>Liu</td><td>H04W 56/001</td></tr>
<tr><td>2017/0230923 A1*</td><td>8/2017</td><td>Huang</td><td>H04W 56/00</td></tr>
</table>

OTHER PUBLICATIONS

Catt, "Resource allocation for D2D synchronization", 3GPP TSG RAN WG1 Meeting #78, R1-142892, Dresden, Germany, Aug. 18-22, 2014, 5 pages.

Ericsson, "Synchronization Signals Design for D2D", 3GPP TSG RAN WG1 Meeting #78bis, R1-144323, Ljubljana, Slovenia, Oct. 6-10, 2014, 3 pages.

Ericsson, "Transmitter Behaviour for D2D Synchronization", 3GPP TSG RAN WG1 Meeting #78bis, R1-144322, Ljubljana, Slovenia, Oct. 6-10, 2014, 7 pages.

* cited by examiner

FIG. 2
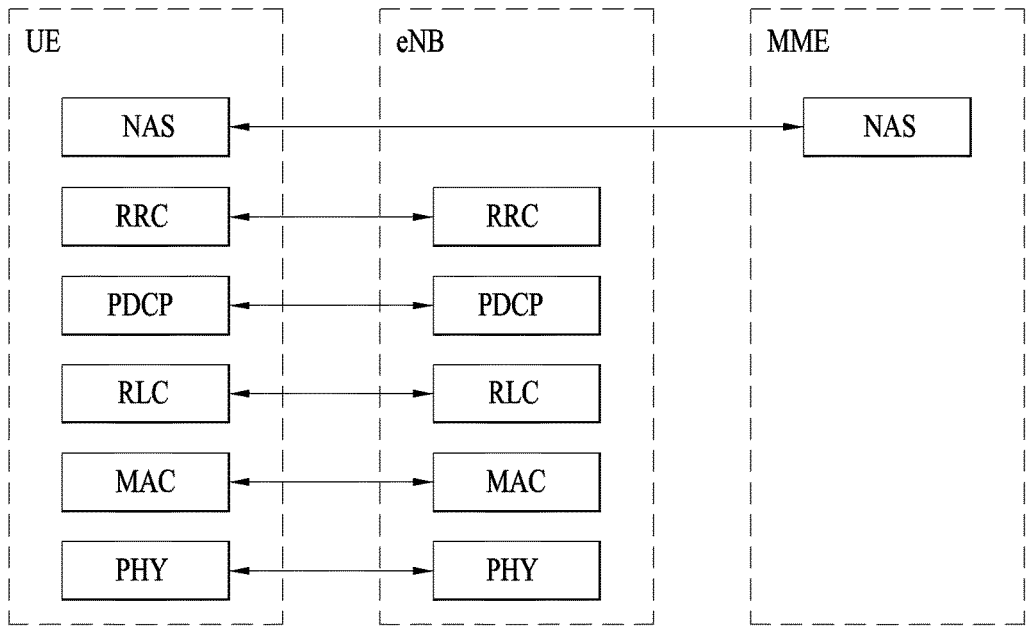
(a) Control-plane protocol stack
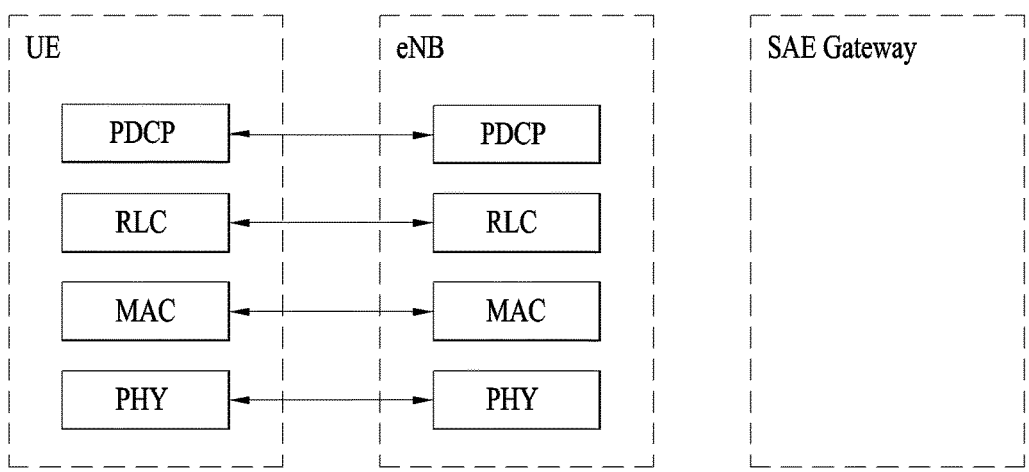
(b) User-plane protocol stack

FIG. 6
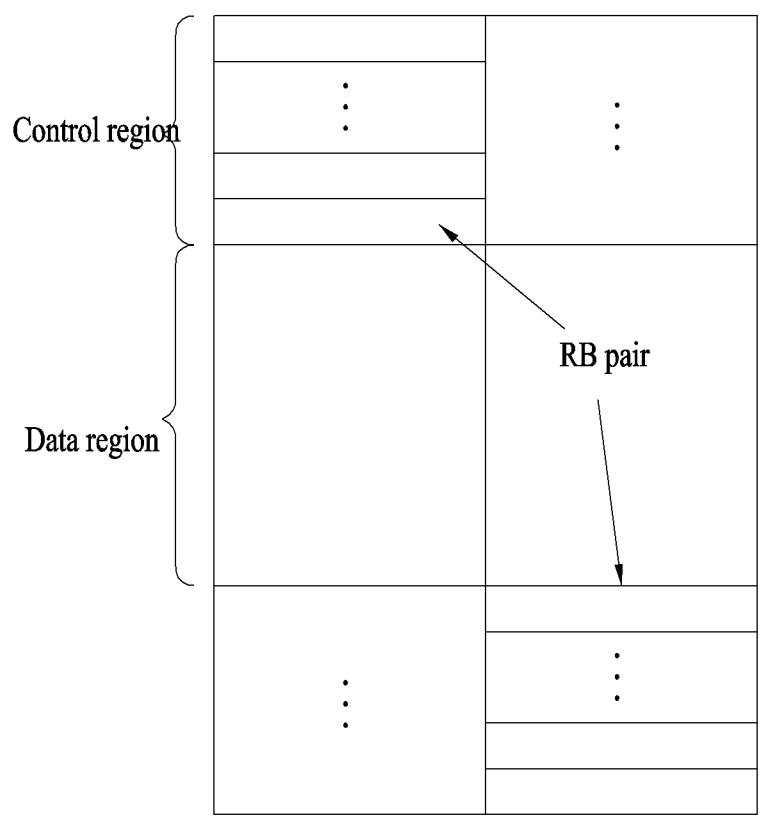
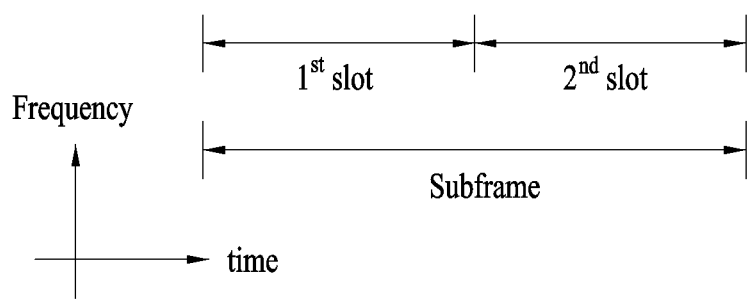

FIG. 13

(a) synchronization signal for D2D discovery signal

P: PSSS for D2D discovery signal
S: SSSS for D2D discovery signal (b) synchronization signal for D2D communication signal

P: PSSS for D2D communication signal
S: SSSS for D2D communication signal

FIG. 14

(a) synchronization signal for D2D discovery signal

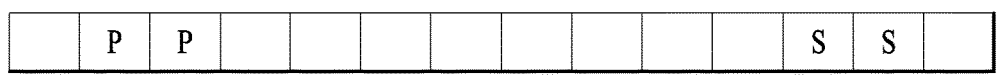

P: PSSS for D2D discovery signal
S: SSSS for D2D discovery signal (b) synchronization signal for D2D communication signal

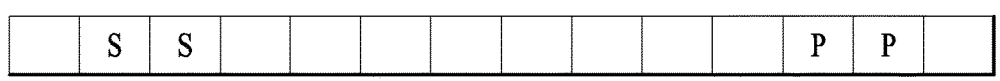

P: PSSS for D2D communication signal
S: SSSS for D2D communication signal

FIG. 15
(a) synchronization signal for D2D discovery signal
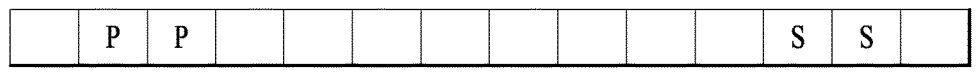
P: PSSS for D2D discovery signal
S: SSSS for D2D discovery signal
(b) synchronization signal for D2D communication signal
P: PSSS for D2D communication signal
S: SSSS for D2D communication signal
FIG. 16
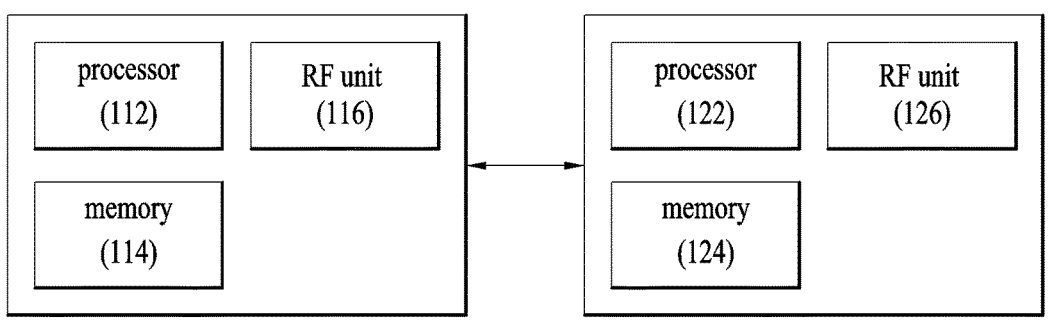

METHOD FOR TRANSMITTING SYNCHRONIZATION SIGNAL FOR DEVICE-TO-DEVICE COMMUNICATION IN WIRELESS COMMUNICATION SYSTEM AND APPARATUS THEREFOR

CROSS REFERENCE TO RELATED APPLICATIONS:

This application is the National Phase of PCT International Application No. PCT/KR2015/010605, filed Oct. 7, 2015, which claims priority under 35 U.S.C. 119(e) to U.S. Provisional Application No. 62/061,084, filed on Oct. 7, 2014, all of which are hereby expressly incorporated by reference into the present application.

TECHNICAL FIELD

The present invention relates to a wireless communication system, and more particularly, to a method of transmitting a synchronization signal for device-to-device communication in a wireless communication system and an apparatus therefor.

BACKGROUND ART

A structure of a 3GPP LTE (3rd Generation Partnership Project Long Term Evolution; hereinafter, referred as "LTE") system which is an example of a wireless communication system to which the present invention may be applied will be described.

FIG. 1 illustrates a schematic structure a network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.25, 2.5, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

DISCLOSURE OF THE INVENTION

Technical Task

An object of the present invention is to provide a method of transmitting or receiving a synchronization signal for device-to-device direct communication in a wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a synchronization signal, which is transmitted by a user equipment in a wireless communication system supporting device-to-device (D2D) communication, includes the steps of mapping a first synchronization signal for a discovery signal to a first subframe and transmitting the first synchronization signal and mapping a second synchronization signal for a communication signal to a second subframe and transmitting the second synchronization signal. In this case, the first synchronization signal can be distinguished from the second synchronization signal based on a mapped symbol position or a sequence in the subframe.

To further achieve these and other advantages and in accordance with the purpose of the present invention, according to a different embodiment, a method of receiving a synchronization signal, which is received by a user equipment in a wireless communication system supporting device-to-device (D2D) communication, includes the steps of obtaining synchronization for a discovery signal by receiving a first synchronization signal for the discovery signal mapped to a first subframe and obtaining synchronization for a communication signal by receiving a second synchronization signal for the communication signal mapped to a second subframe. In this case, the first synchronization signal can be distinguished from the second synchronization signal based on a mapped symbol position or a sequence in the subframe.

To further achieve these and other advantages and in accordance with the purpose of the present invention, according to a further different embodiment, a user equipment transmitting a synchronization signal in a wireless communication system supporting device-to-device (D2D) communication includes a transceiving module configured to perform transmission and reception with a counterpart UE and a processor configured to control the transceiving module, the processor configured to control the transceiving module to map a first synchronization signal for a discovery signal to a first subframe and transmit the first synchronization signal, the processor configured to control the transceiving module to map a second synchronization signal for a communication signal to a second subframe and transmit the second synchronization signal. In this case, the first synchronization signal can be distinguished from the second synchronization signal based on a mapped symbol position or a sequence in the subframe.

To further achieve these and other advantages and in accordance with the purpose of the present invention, according to a further different embodiment, a user equipment receiving a synchronization signal in a wireless communication system supporting device-to-device (D2D) communication includes a transceiving module configured to perform transmission and reception with a counterpart UE and a processor configured to control the transceiving module, the processor configured to control the transceiving module to receive a first synchronization signal for a discovery signal mapped to a first subframe to obtain synchronization for the discovery signal based on the first synchronization signal, the processor configured to control the transceiving module to receive a second synchronization signal for a communication signal mapped to a second subframe to obtain synchronization for the communication signal based on the second synchronization signal. In this case, the first synchronization signal can be distinguished from the second synchronization signal based on a mapped symbol position or a sequence in the subframe.

Following items can be commonly applied to the aforementioned embodiments.

The first synchronization signal and the second synchronization signal can be mapped to a different symbol position in each subframe.

Preferably, the first synchronization signal includes a first primary synchronization signal and a first secondary synchronization signal for the discovery signal and the second synchronization signal can include a second primary synchronization signal and a second secondary synchronization signal for the communication signal.

A symbol position to which the first primary synchronization signal of the first synchronization signal is mapped can be identical to a symbol position to which the second secondary synchronization signal of the second synchronization signal is mapped.

Or, a symbol position to which the first secondary synchronization signal of the first synchronization signal is mapped can be identical to a symbol position to which the second primary synchronization signal of the second synchronization signal is mapped.

Or, a mapping order of the first primary synchronization signal and the first secondary synchronization signal in a subframe can be determined in a manner of being different from a mapping order of the second primary synchronization signal and the second secondary synchronization signal in a subframe.

Or, the first secondary synchronization signal and the second secondary synchronization signal can be generated using a different sequence.

The aforementioned embodiments of the present invention are just a part of preferred embodiments of the present invention. Various embodiments to which technical characteristics of the present invention are reflected can be deducted and understood by those skilled in the art based on the detailed explanation of the present invention described in the following.

Advantageous Effects

According to the present invention, it is able to efficiently perform transmission and reception of a D2D (device-to-device) signal in a wireless communication system. Specifically, it is able to efficiently transmit or receive a synchronization signal for device-to-device direct communication in a system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram for structures of control and user planes of radio interface protocol between a 3GPP radio access network standard-based user equipment and E-UTRAN;

FIG. 6 is a diagram for an example of a structure of a uplink subframe;

FIG. 13 is a diagram for a method of distinguishing a synchronization signal according to one embodiment of the present invention;

FIG. 14 is a diagram for a method of distinguishing a synchronization signal according to a different embodiment of the present invention;

FIG. 15 is a diagram for a method of distinguishing a synchronization signal according to a further different embodiment of the present invention;

FIG. 16 is a diagram for a base station and a user equipment applicable to embodiments of the present invention.

BEST MODE

Mode for Invention

Figure 1:
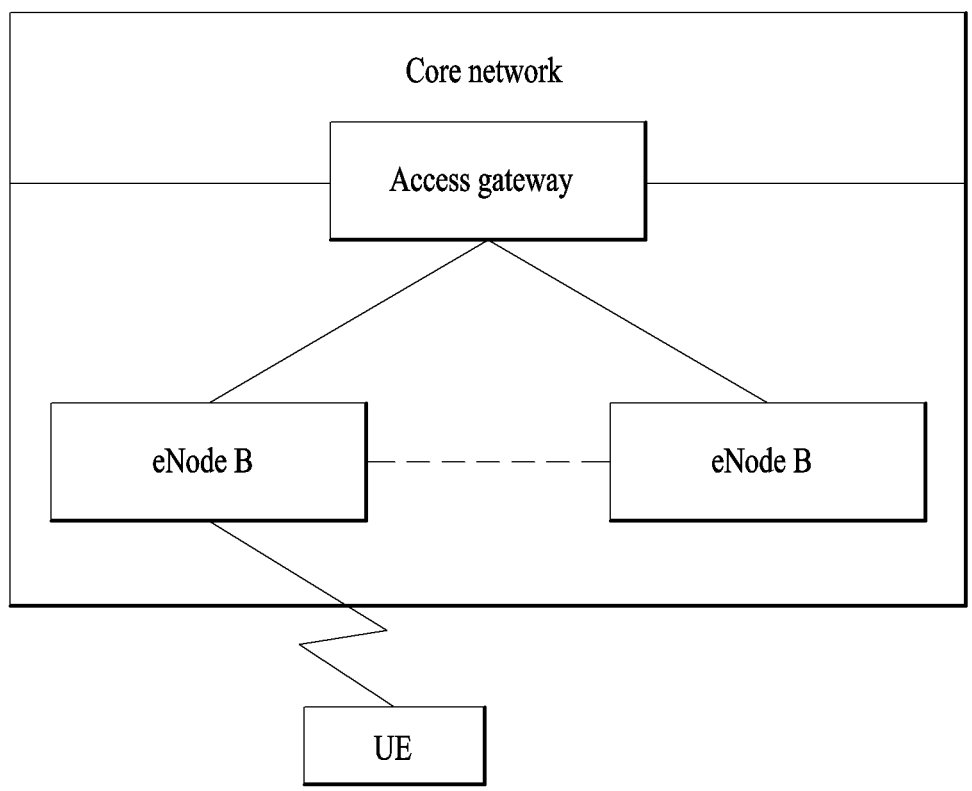
FIG. 1 is a diagram of E-UMTS network structure as one example of a wireless communication system.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access),SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE—Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System).

For clarity, the following description focuses on the 3GPP LTE and 3GPP LTE-A system. However, technical features of the present invention are not limited thereto.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, interne packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
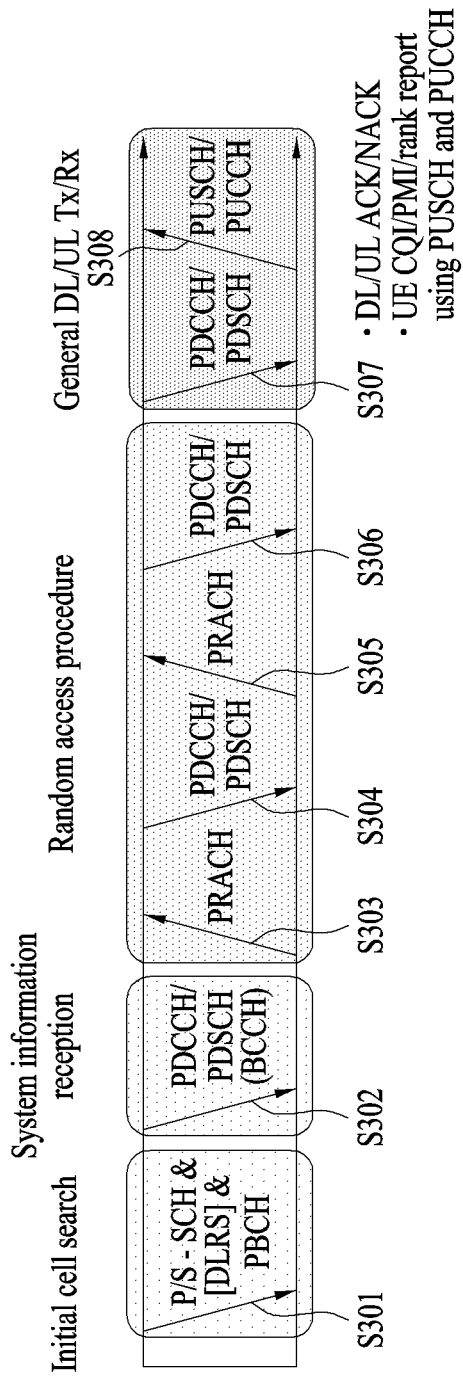
FIG. 3 is a diagram for explaining physical channels used for 3GPP LTE system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose. Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
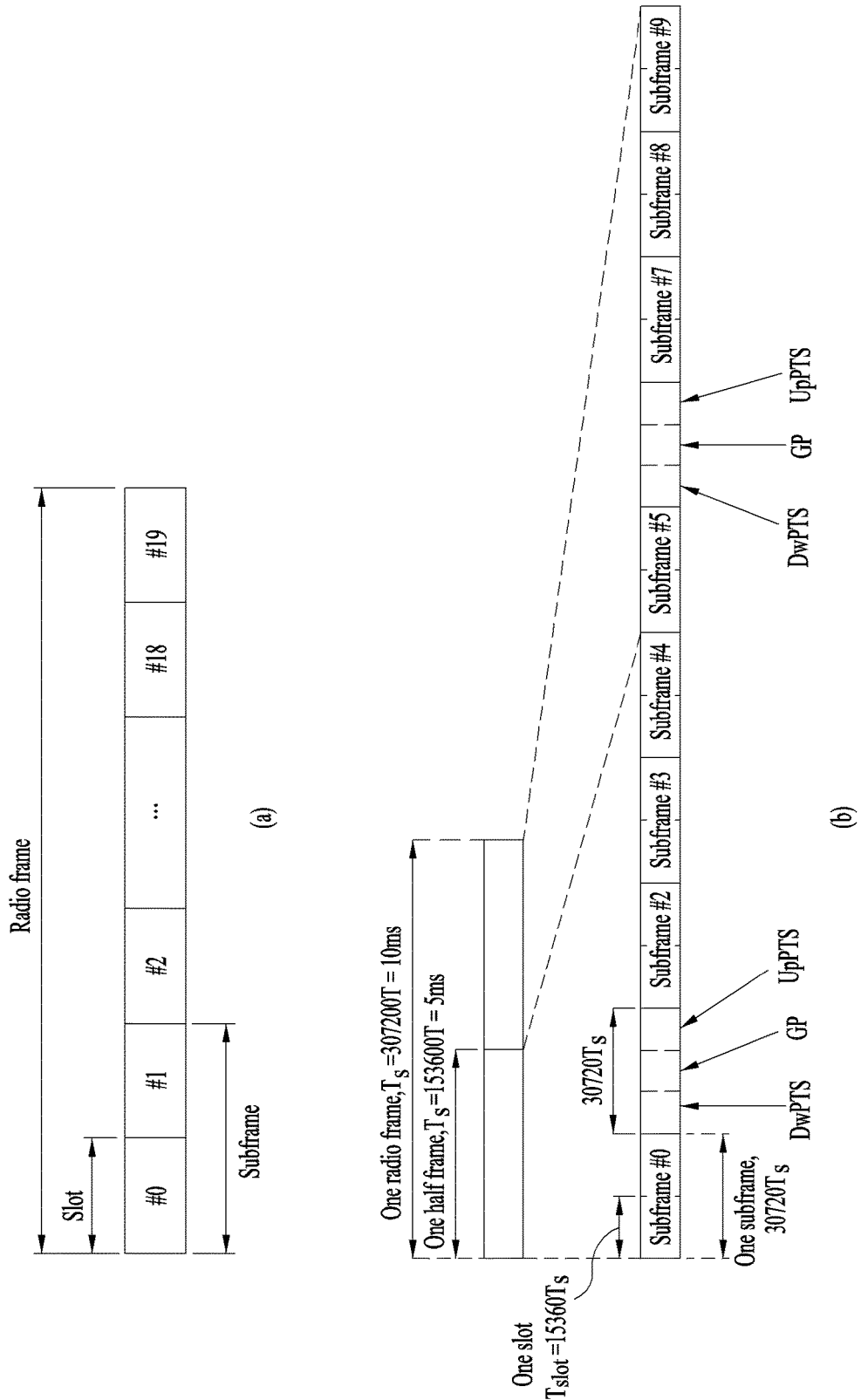
FIG. 4 is a diagram for a structure of a radio frame in LTE system.

The structure of a radio frame of 3GPP LTE system will be described with reference to FIG. 4.

In a cellular Orthogonal Frequency Division Multiplexing (OFDM) radio packet communication system, uplink/downlink data packets are transmitted in subframes. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 4(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 4(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots.

The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

The current 3GPP standard document defines configuration of the special subframe as shown in Table 2 below. Table 2 shows DwPTS and UpPTS given when TS=1/(15000*2048), and the other region is configured as a GP.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the LTE TDD system, uplink/downlink subframe configurations (UL/DL configurations) are given as shown in Table 1 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 5:
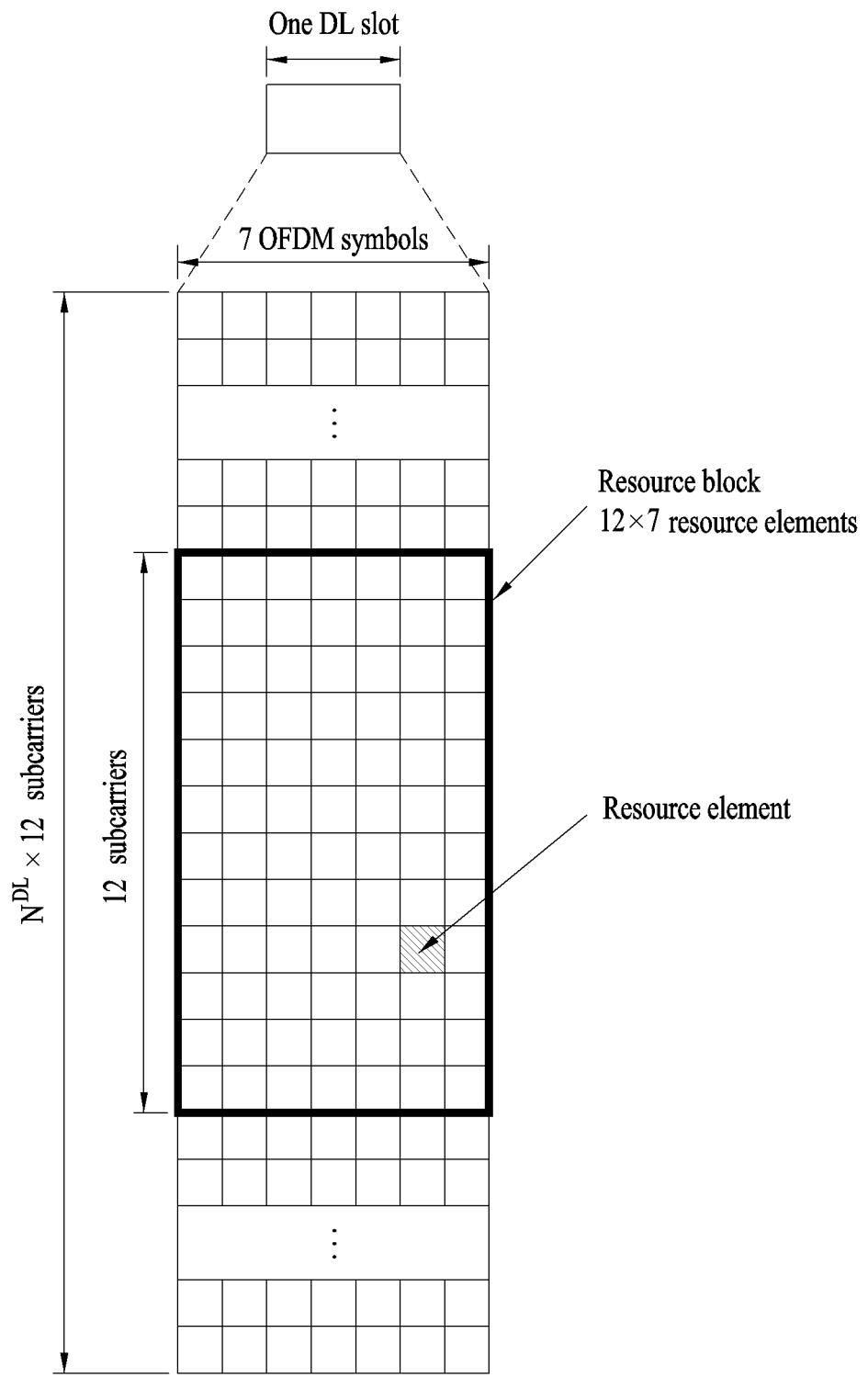
FIG. 5 is a diagram for a resource grid of a downlink slot.

FIG. 5 is a diagram illustrating a resource grid for a downlink slot.

Referring to FIG. 5, a DL slot includes $N_{symb}^{DL}$ OFDM symbols in the time domain and $N_{RB}^{DL}$ resource blocks in the frequency domain. Since each resource block includes $N_{sc}^{RB}$ subcarriers, the DL slot includes $N_{RB}^{DL} \times N_{sc}^{RB}$ subcarriers in the frequency domain. Although FIG. 5 illustrates that the DL slot includes seven OFDM symbols and the resource block includes twelve subcarriers, it is to be understood that the downlink slot and the resource block are not limited thereto. For example, the number of OFDM symbols included in the downlink slot may be varied depending on a length of CP (cyclic prefix).

Each element on the resource grid is referred to as a resource element (RE). One resource element is indicated by one OFDM symbol index and one subcarrier index. One RB includes $N_{symb}^{DL} \times N_{sc}^{RB}$ number of REs. The number $N_{RB}^{DL}$ of RBs included in the DL slot depends on a DL transmission bandwidth configured in a cell.

FIG. 6 illustrates a structure of an uplink subframe applicable to embodiments of the present invention.

Referring to FIG. 6, a UL subframe may be divided into a control region and a data region in the frequency domain. A PUCCH for carrying uplink control information is allocated to the control region and a PUSCH for carrying user data is allocated to the data region. In the LTE system, a UE does not simultaneously transmit the PUCCH and the PUSCH to maintain a single carrier property. However, in the LTE-A system, a PUCCH signal and a PUSCH signal can be simultaneously transmitted due to the introduction of carrier aggregation technology. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Figure 7:
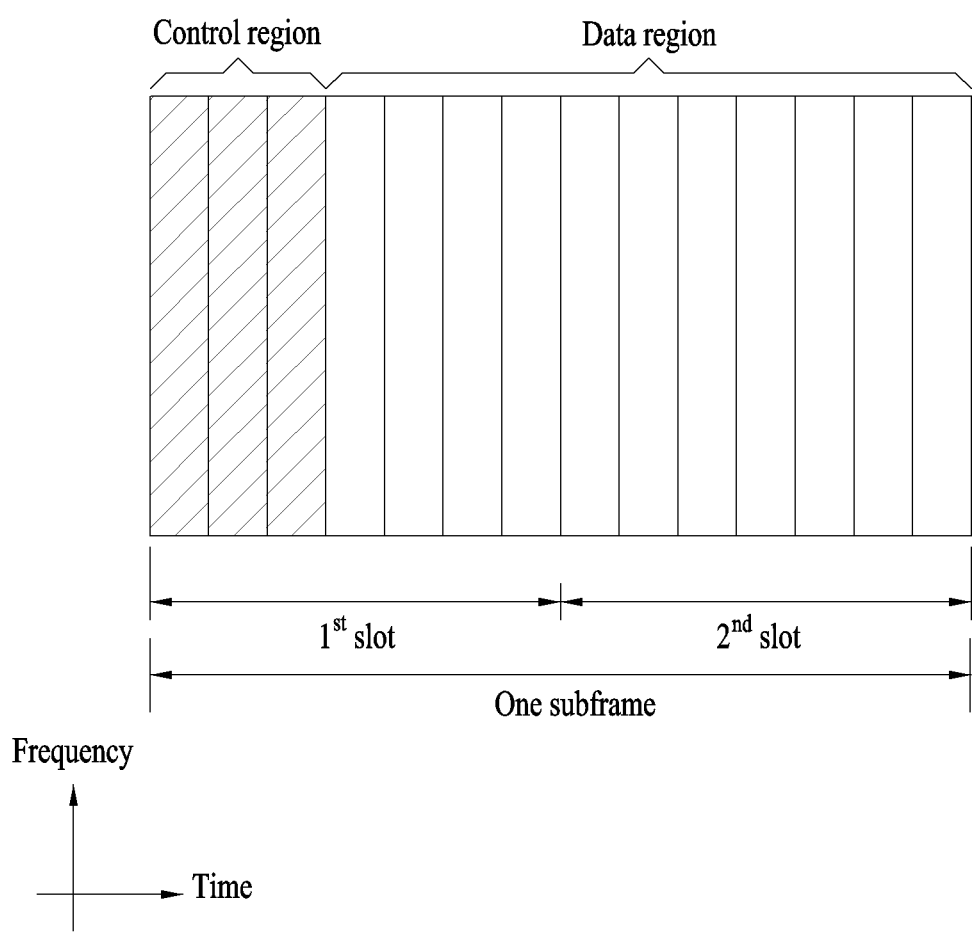
FIG. 7 is a diagram for a structure of a downlink subframe in LTE system.

FIG. 7 is a diagram illustrating a structure of a downlink subframe applicable to embodiments of the present invention.

Referring to FIG. 7, a maximum of three OFDM symbols from OFDM symbol index #0 of a first slot in a subframe correspond to a control region to be assigned with a control channel. The remaining OFDM symbols correspond to a data region to be assigned with a PDSCH. Examples of downlink control channels used in the 3GPP LTE system includes a physical control format indicator channel (PCFICH), a physical downlink control channel (PDCCH), a physical hybrid ARQ indicator channel (PHICH), etc.

The PCFICH is transmitted in a first OFDM symbol of a subframe and carries information on the number of OFDM symbols used for transmission of control channels (i.e. the size of the control region) in the subframe. The PHICH is a channel in response to UL transmission and carries ACK/NACK (acknowledgement/negative-acknowledgement) signal for HARQ (hybrid automatic repeat request). Control information transmitted through the PDCCH is called downlink control information (DCI). The DCI includes UL resource allocation information, DL resource allocation information, or UL transmit (TX) power control commands for a random UE group.

Carrier Aggregation

Figure 8:
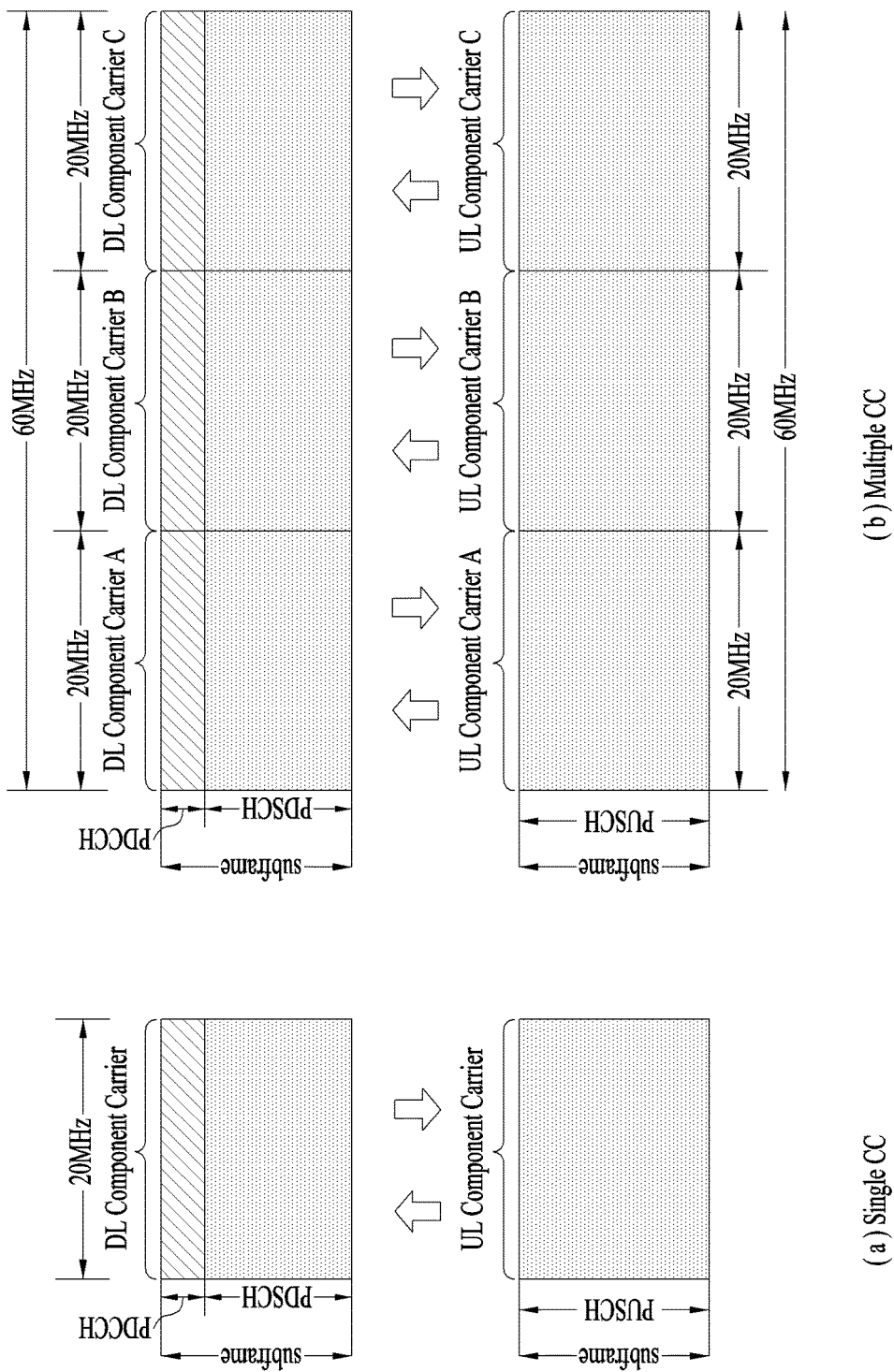
FIG. 8 is a diagram for explaining carrier aggregation.

FIG. 8 is a diagram for explaining carrier aggregation. Before description is given of carrier aggregation, the concept of a cell introduced to manage radio resources in LTE-A will be described first. A cell may be regarded as a combination of downlink resources and uplink resources. The uplink resource is not an essential element of the cell. The uplink resources are not essential elements and thus the cell may be composed of the downlink resources only or both of the downlink resources and uplink resources. However, this is the definition defined in the LTE-A release 10 and the cell may be composed of the uplink resources only. The DL resource may be called a downlink component carrier (DL CC) and the UL resource may be called an uplink component carrier (UL CC). The UL CC and the DL CC can be represented by a carrier frequency. The carrier frequency means a center frequency of a corresponding cell.

Cells may be divided into a primary cell (PCell), which operates at a primary frequency, and a secondary cell (SCell), which operates at a secondary frequency. The PCell and the SCell may be collectively referred to as a serving cell. The PCell may be designated during an initial connection establishment, connection re-establishment or handover procedure of a UE. In other words, the PCell may be understood as a cell that serves as a control-related center in a carrier aggregation environment, which will be described in detail later. A UE may be assigned a PUCCH in the PCell thereof and may then transmit the assigned PUCCH. The SCell may be configured after establishment of radio resource control (RRC) connection and it may be used for providing additional radio resources. In the carrier aggregation environment, all serving cells except the PCell may be considered as SCells. In case that a UE in an RRC_CONNECTED state fails to establish the carrier aggregation or does not support the carrier aggregation, only a single serving cell consisting of PCells exists. On the other hand, in the case in which a UE is in the RRC_CONNECTED state and the carrier aggregation is established, one or more serving cells exist. Moreover, in this case, PCells and all SCells are included in the serving cells. After starting an initial security activation procedure, a network may configure one or more SCells in addition to the PCell configured at the beginning of the connection establishment procedure for a UE supporting the carrier aggregation.

Hereinafter, the carrier aggregation is described with reference to FIG. 8. The carrier aggregation is a technology introduced to allow the use of a broader band to meet the demands for a high-speed transmission rate. The carrier aggregation may be defined as aggregation of two or more component carriers (CCs) having different carrier frequencies or aggregation of two or more cells. Referring to FIG. 8, FIG. 8 (a) shows a subframe in the legacy LTE system in which one CC is used and FIG. 8 (b) shows a subframe to which the carrier aggregation is applied. Particularly, FIG. 8 (b) illustrates an example in which a bandwidth of total 60 MHz is supported in a manner of using three CCs of 20 MHz. In this case, the three CCs may be contiguous or non-contiguous.

A UE may simultaneously receive and monitor downlink data through a plurality of DL CCs. Linkage between a DL CC and a UL CC may be indicated by system information. The DL CC/UL CC link may be fixed in the system or may be semi-statically configured. Additionally, even if an entire system band is configured with N CCs, a frequency band that can be monitored/received by a specific UE may be limited to M(<N) CCs. Various parameters for the carrier aggregation may be set up cell-specifically, UE group-specifically, or UE-specifically.

Figure 9:
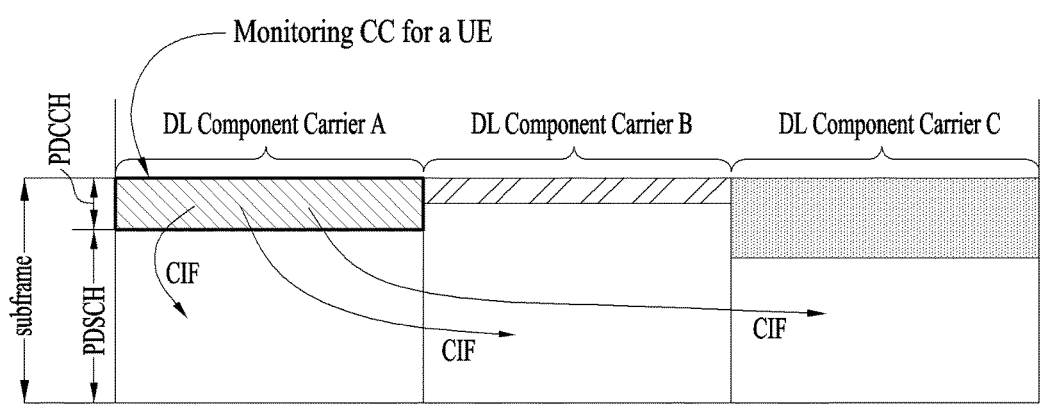
FIG. 9 is a diagram for explaining cross-carrier scheduling.

FIG. 9 is a diagram for explaining cross carrier scheduling. For instance, the cross carrier scheduling means to include all DL scheduling allocation information of a DL CC in a control region of another DL CC selected from a plurality of serving cells. Alternatively, the cross carrier scheduling means to include all UL scheduling grant information on a plurality of UL CCs, which are linked to a DL CC selected among a plurality of serving cells, in a control region of the DL CC.

Hereinafter, a carrier indicator field (CIF) will be described.

As described above, the CIF may be included in a DCI format transmitted through a PDCCH (in this case, a size of the CIF may be defined as, for example, 3 bits) or may not be included in the DCI format (in this case, a size of the CIF may be defined as 0 bit). If the CIF is included in the DCI format, this indicates that the cross-carrier scheduling is applied. In case that the cross-carrier scheduling is not applied, downlink scheduling allocation information is valid for a DL CC through which the downlink scheduling allocation information is currently transmitted. In addition, an uplink scheduling grant is valid for a UL CC linked to the DL CC through which the downlink scheduling allocation information is transmitted.

In case that the cross-carrier scheduling is applied, the CIF indicates a CC related to the downlink scheduling allocation information which is transmitted over the PDCCH in a DL CC. For example, referring to FIG. 9, downlink allocation information on DL CC B and DL CC C, i.e., information on PDSCH resources, is transmitted through a PDCCH in a control region of DL CC A. After monitoring DL CC A, a UE may recognize that a resource region of PDSCH and the corresponding CC.

Whether or not the CIF is included in the PDCCH may be set semi-statically and the CIF may be enabled UE-specifically through higher layer signaling.

When the CIF is disabled, a PDCCH in a specific DL CC allocates a PDSCH resource in the same DL CC and may also allocate a PUSCH resource in a UL CC linked to the specific DL CC. In this case, a coding scheme, CCE-based resource mapping, a DCI format, and the like identical to those in the legacy PDCCH structure may be applied.

On the other hand, when the CIF is enabled, a PDCCH in a specific DL CC may allocate a PDSCH/PUSCH resource in a single DL/UL CC indicated by the CIF, among a plurality of the aggregated CCs. In this case, the CIF may be additionally defined in the legacy PDCCH DCI format. That is, the CIF may be defined as a field with a fixed length of 3 bits. Alternatively, a CIF position may be fixed regardless of a size of the DCI format. The coding scheme, CCE-based resource mapping, DCI format, and the like of the legacy PDCCH structure may also be applied to this case.

When the CIF exists, an eNB may allocate a DL CC set in which the PDCCH is to be monitored. Accordingly, the burden of blind decoding to a UE may be lessened. The PDCCH monitoring CC set corresponds to a portion of all aggregated DL CCs and the UE may perform PDCCH detection/decoding only in the corresponding CC set. In other words, to perform PDSCH/PUSCH scheduling for a UE, the eNB may transmit the PDCCH only in the PDCCH monitoring CC set. The PDCCH monitoring DL CC set may be configured UE-specifically, UE group-specifically or cell-specifically. For example, when 3 DL CCs are aggregated as shown in the example of FIG. 9, DL CC A may be set as a PDCCH monitoring DL CC. If the CIF is disabled, the PDCCH in each DL CC may schedule only the PDSCH within the DL CC A. On the other hand, if the CIF is enabled, the PDCCH in DL CC A may schedule not only the PDCCH of the DL CC A but also the PDSCH of the other DL CCs. In the case that the DL CC A is set as the PDCCH monitoring CC, the PDCCH may not be transmitted in DL CC B and DL CC C.

Transmission Timing Adjustments

In the LTE system, the amount of time that a signal transmitted from a UE takes to reach an eNB may vary depending on a radius of a cell, a location of the UE in a cell, mobility of the UE, and the like. That is, unless the eNB controls a UL transmission timing of each UE, interference may occur between UEs while each UE communicates with the eNB. Moreover, this may increase an error occurrence rate of the eNB. The amount of time that the signal transmitted from the UE takes to reach the eNB may be referred to as a timing advance. Assuming that a UE is randomly located randomly in a cell, the timing advance from the UE to the eNB may vary depending on a location of the UE. For instance, if the UE is located at the boundary of the cell instead of at the center of the cell, the timing advance of the UE may be increased. In addition, the timing advance may vary depending on a frequency band of the cell. Thus, the eNB needs to be able to manage or adjust transmission timings of UEs in the cell to prevent the interference between UEs. The management or adjustment of transmission timings, which is performed by the eNB, may be referred to as timing advance maintenance or time alignment.

The timing advance maintenance or time alignment may be performed in a random access procedure. During the random access procedure, an eNB may receive a random access preamble from a UE and then calculate a timing advance value using the received random access preamble. The UE may receive the calculated timing advance value through a random access response and then update a signal transmission timing based on the received timing advance value. Alternatively, after receiving an uplink reference signal (e.g., SRS (sounding reference signal) that is transmitted periodically or aperiodically from the UE, the eNB may calculate the timing advance. Thereafter, the UE may update the signal transmission timing based on the calculated timing advance value.

As described above, the eNB may measure UE's timing advance through the random access preamble or the uplink reference signal and then inform the UE of an adjustment value for the time alignment. Here, the adjustment value for time alignment may be referred to as a timing advance command (TAC). The TAC may be processed by a MAC layer. If a UE receives the TAC from the eNB, the UE assumes that the received TAC is valid only for a prescribed time. A time alignment timer (TAT) may be used for indicating the prescribed time. A TAT value may be transmitted to the UE through higher layer signaling (e.g., RRC signaling).

A UE may start transmission of uplink radio frame #i $(N_{TA}+N_{TAoffset})\times T_s$ seconds before the start of a corresponding downlink radio frame, where $0 \leq N_{TA} \leq 20512$, $N_{TAoffset}=0$ in case of a FDD frame structure, and $N_{TAoffset}=624$ in case of a TDD frame structure. $N_{TA}$ may be indicated by the TAC and $T_s$ represents a sampling time. The UL transmission timing may be adjusted in unit of a multiple of $16T_s$. The TAC may be given as 11 bits in the random access response and it may indicate a value of 0 to 1282. In addition, $N_{TA}$ may be given TA*16. Alternatively, the TAC may be given as 6 bits and it may indicate a value of 0 to 63. In this case, $N_{TA}$ is given as $N_{TA,old}+(TA-31)*16$. The TAC received in subframe n may be applied starting from subframe n+6.

TAG (Timing Advance Group)

In case that a UE use a plurality of serving cells, there may be serving cells having similar timing advance characteristics. For example, serving cells having similar frequency characteristics (e.g. frequency bands) or similar propagation delays may have similar timing advance characteristics. Thus, when carrier aggregation is performed, serving cells having similar timing advance characteristics may be managed as a group to optimize signaling overhead caused by synchronization adjustment of a plurality of uplink timings. Such a group may be referred to as a timing advance group (TAG). Serving cell(s) having similar timing advance characteristics may belong to one TAG and at least one serving cell(s) in the TAG must have uplink resources. For each serving cell, an eNB may inform a UE of TAG allocation using a TAG identifier through higher layer signaling (e.g. RRC signaling). Two or more TAGs may be configured for one UE. If a TAG identifier indicates 0, this may mean a TAG including a PCell. For convenience, the TAG including the PCell may be referred to as a primary TAG (pTAG) and TAG(s) other than the pTAG may be referred to as a secondary TAG (sTAG or secTAG). A secondary TAG identifier (sTAG ID) may be used to indicate an sTAG corresponding to an SCell. If an sTAG ID is not configured for an SCell, the SCell may be configured as a part of pTAG. One TA may be commonly applied to all CCs included in one TA group.

TAC MAC CE (Timing Advance Command MAC CE)

In the 3GPP LTE system, MAC (medium access control) PDU (protocol data unit) includes a MAC header, a MAC control element (CE), and at least one MAC service data unit (SDU). The MAC header includes at least one sub-header. Each sub-header corresponds to the MAC CE and MAC SDU. The sub-header is used to represent lengths and properties of the MAC CE and MAC SDU.

The MAC SDU is a data block provided from a higher layer (e.g., an RLC layer or an RRC layer) of a MAC layer. The MAC CE is used to deliver control information of the MAC layer such as a buffer status report.

The MAC sub-header includes the following fields

R (1 bit): A reserved field.

E (1 bit): An extended field. It indicates whether there are F and L fields in a next field.

LCID (5 bit): A logical channel ID field. It indicates a type of the MAC CE or a specific logical channel to which the MAC SDU belongs.

F (1 bit): A format field. It indicates whether a next L field has a size of 7 bits or 15 bits.

L (7 or 15 bit): A length field. It indicates a length of the MAC CE or MAC SDU corresponding to the MAC sub-header.

The F and L fields are not included in a MAC sub-header corresponding to a fixed-sized MAC CE.

Figure 10:
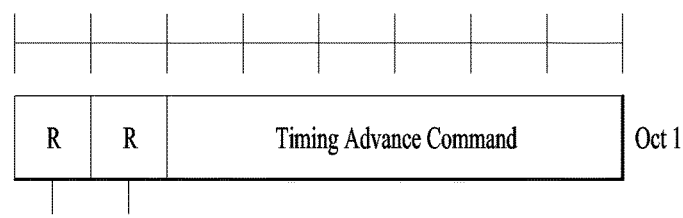
FIG. 10 is a diagram for a structure of TAC MAC CE.

FIG. 10 illustrates TAC MAC CE corresponding to a fixed-sized MAC CE. TAC is used for controlling the amount of time adjustment to be applied to a UE and it is identified by the LCID of the MAC PDU sub-header. Here, the MAC CE has a fixed size and it is configured with a single octet as shown in FIG. 10.

R (1 bit): A reserved field.

TAC (timing advance command) (6 bits): It indicates a $T_A$ index value (e.g., 0, 1, 2, . . . , 63) used for controlling the amount of time adjustment to be applied to a UE.

Although the adjustment value for the time alignment may be transmitted through the TAC, it may be transmitted through a random access response (hereinafter abbreviated as RAR) in response to a random access preamble transmitted from a UE for initial access.

A Case of having a Plurality of TAs

Figure 11:
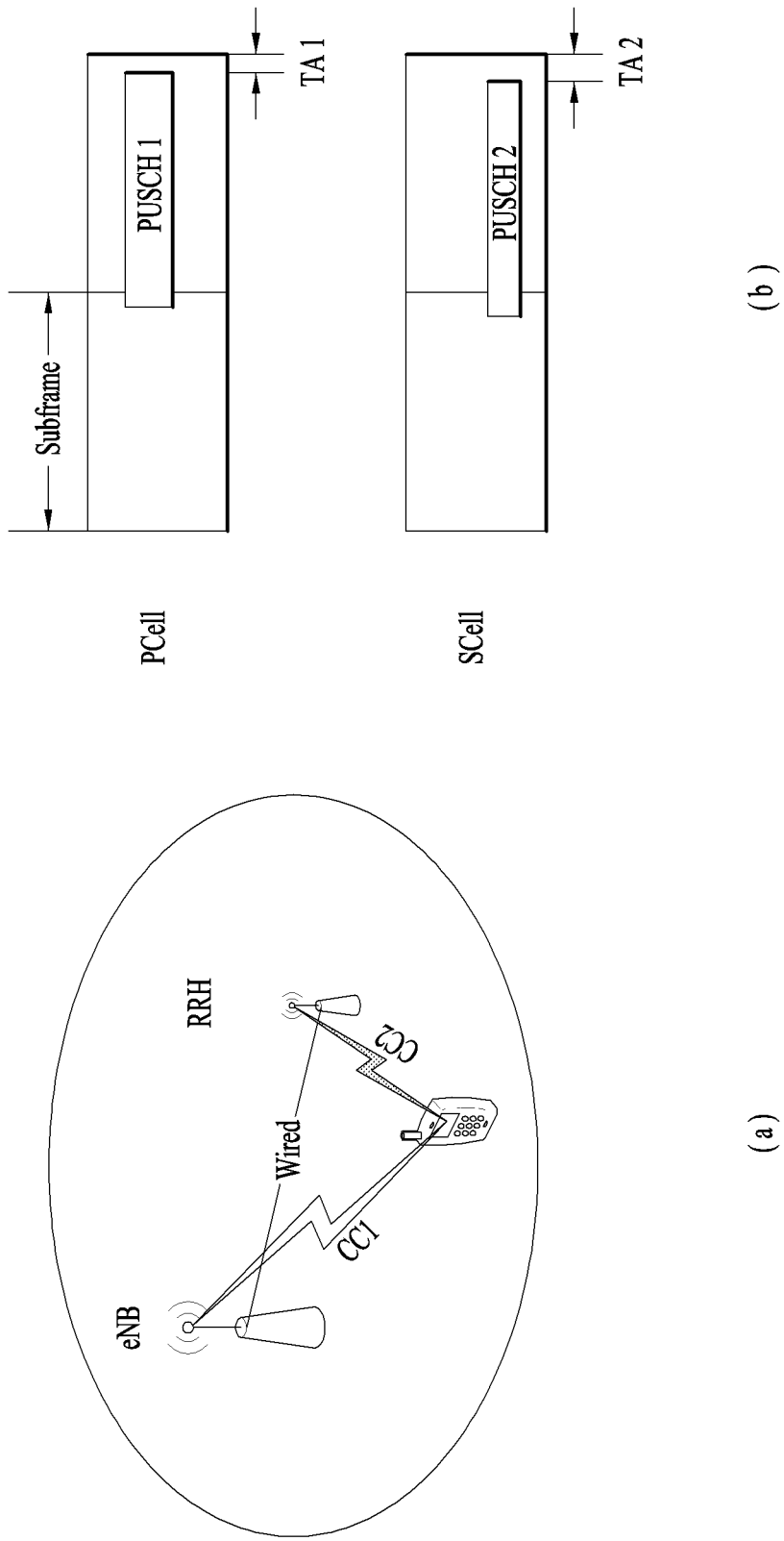
FIG. 11 is a diagram for an example of aggregating a plurality of cells having a different frequency property.

FIG. 11 illustrates an example of aggregating a plurality of cells with different frequency characteristics. In the LTE Release 8/9/10 system, when performing aggregation of a plurality of CCs, a UE commonly applies a timing advance (TA) value that can be applied to one CC (e.g., PCell or P carrier) to the plurality of the CCs and then uses it for UL transmission. On the other hand, in the LTE-A system, a UE may be allowed to aggregate a plurality of cells belonging to different frequency bands (i.e., separated far from each other in the frequency domain), a plurality of cells with different propagation characteristics, or a plurality of cells with different coverage. Moreover, in case of a specific cell, it may be considered that RRH (remote radio header) devices such as a repeater are deployed within the cell for the purpose of coverage expansion or coverage hole elimination. For instance, inter-site carrier aggregation may be performed between cells formed in different locations. Here, the RRH can be referred to as a remote radio unit (RRU). The eNB and RRH (or RRU) can be referred to as a node or a transmitting node.

For instance, referring to FIG. 11 (a), a UE aggregates two cells (i.e., cell 1 and cell 2). The cell 1 (or cc 1) may be formed to perform direct communication with an eNB without the RRH and the cell 2 may be formed to use the RRH due to limited coverage. In this case, a propagation delay (or eNB's reception timing) of a UL signal transmitted from a UE through the cell 2 (or CC 2) may be different from a propagation delay (or eNB's reception timing) of a UL signal transmitted through the cell 1 due to a location of the UE, frequency characteristics, etc. When a plurality of cells have different propagation delay characteristics as described above, multiple timing advances (TAs) are inevitable.

FIG. 11 (b) illustrates a plurality of cells with different TAs. Referring to FIG. 11 (b), a UE aggregates two cells (e.g., PCell and SCell). The UE may transmit a UL signal (PUSCH) by applying different TA to each of the two cells.

In case that the UE receives a plurality of TAs, if a UL signal transmission timing of a specific cell (e.g., PCell) is significantly different from that of a different cell, a method of restricting uplink signal transmission in a corresponding cell may be considered. For instance, if a gap between the transmission timings is higher than a specific threshold value, the method of the restricting uplink signal transmission in the corresponding CC may be considered. The specific threshold value may be configured as a higher signal or it may be informed to the UE in advance. For instance, if UL signals transmitted from the UE have significantly different transmission timings, it may cause an irregular UL/DL signal transmission timing relationship between the UE and the eNB. That is, the method is required to prevent malfunction caused by the irregular UL/DL signal transmission timing relationship between the UE and the eNB.

Moreover, if a difference between timings for transmitting PUSCH/PUCCH and the like, which are transmitted to different cells in the same subframe by a single UE, it may increase complexity of UL signal configuration and response time adjustment between DL and UL.

Accordingly, when uplink transmission timings between a plurality of cells are significantly different from each other due to an independent TA operation, a scheme for dropping transmission of uplink signals (e.g., PUSCH, PUCCH, SRS, RACH, etc.) of a UE or a scheme for limiting a transmission timing may be considered. Particularly, the present invention proposes the following schemes.

Scheme 1

If a TA difference between a plurality of cells in which a UE needs to perform UL transmission is equal to or higher than a threshold, the UE always drops uplink transmission to a random cell to maintain a TA difference between actually transmitted uplink signals below the threshold at all times. In this case, the UE may drop uplink signal transmission to a cell, of which a TA difference exceeds the threshold with reference to a specific cell. More particularly, the specific cell may be a PCell or belong to a PCell group. Alternatively, the specific cell may be configured by a network through RRC signaling, etc. Here, an operation of dropping the uplink signal transmission may include an operation of not transmitting a signal of which transmission is previously configured, an operation of not expecting or discarding a command of scheduling PUSCH for a corresponding cell when the TA difference exceeds the threshold.

Scheme 2

If a TA difference between a plurality of cells in which a UE needs to perform UL transmission is equal to or higher than a threshold, the UE adjusts an uplink transmission timing for a random cell to maintain a TA difference between the transmission timing for the random cell and a transmission timing for another cell below the threshold. In this case, the UE may adjust a transmission timing of an uplink signal for a cell, of which a TA difference exceeds the threshold with reference to a specific cell. Here, the specific cell may be a PCell or belong to a PCell group. Alternatively, the specific cell may be configured by a network through RRC signaling, etc.

Scheme 3

If a UE receives a TAC (timing advance command) with a TA difference between a plurality of cells, in which the UE needs to perform UL transmission, equal to or higher than a threshold, the UE discards the corresponding TAC or limitedly applies the TAC only when the TA difference is lower than the threshold. In this case, the UE may apply the scheme 3 only when receiving TAC of which a TA difference exceeds the threshold with reference to a specific cell. Here, the specific cell may be a PCell or belong to a PCell group. Alternatively, the specific cell may be configured by a network through higher layer signaling (e.g., RRC signaling), etc.

In the above schemes, the TA threshold value may be configured by the network through higher layer signaling (e.g., RRC signaling), etc. In addition, the cell may include a cell group, and more specifically, a cell group to which the same TAC is applied. Moreover, the TA difference may include a difference between TA values managed by a UE, a difference between TA values that a UE needs to apply to transmission of a specific subframe, a difference between values of TACs received by a UE, or a difference between transmission timings which a UE needs to apply to transmission. Furthermore, when PRACH, i.e., a signal corresponding to exception of TA application controlled by a TAC value is transmitted, the TA difference limitation scheme may not be applied.

Reference Signal

Hereinafter, a reference signal will be described in detail.

In general, a reference signal previously known to both a transmitter and a receiver is transmitted along with data from the transmitter to the receiver for channel measurement. The reference signal provides a modulation scheme as well as channel measurement so that a demodulation process is performed. The reference signal is classified into a dedicated RS (DRS) for an eNB and a specific UE, i.e., a UE-specific reference signal and a cell-specific reference signal (CRS) for all UEs in a cell, i.e., a common RS. In addition, the CRS includes a reference signal used for a UE to measure CQI/PMI/RI and report the same to the eNB, which is referred to as a channel state information reference signal (CSI-RS).

The CRS (common reference signal) corresponding to the cell-specific reference signal transmitted for channel measurement and data demodulation may be transmitted to the UE over a control information region as well as a data information region.

In addition, a DL DM-RS (demodulation-RS) corresponding to the UE-specific RS supports single antenna port transmission through a data region, i.e., a PDSCH. Whether the DM-RS corresponding to the UE-specific RS is present is signaled to the UE through a higher layer. In 3GPP standard document 36.211, DM-RSs for antenna ports 7 to 1, i.e., total 8 antenna ports are defined.

FIG. 9 illustrates an example of mapping DL DM-RSs defined in the current 3GPP standard document. Referring to FIG. 9, DM-RSs corresponding to antenna ports {7, 8, 11, 13} are mapped to DM-RS group 1 using a sequence per antenna port and DM-RSs corresponding to antenna ports {9, 10, 12, 14} are mapped to DM-RS group 2 using a sequence per antenna port.

Meanwhile, unlike the CRS, the above-described CSI-RS has been proposed for the purpose of channel measurement with respect to the PDSCH. Different from the CRS, the CSI-RS can be defined to have maximum 32 different resource configurations to reduce inter-cell interference (ICI) in a multi-cell environment.

Synchronization Signal

Hereinafter, a synchronization signal will be described.

When a UE is powered on or intends to access a new cell, the UE performs an initial cell search procedure for obtaining time and frequency synchronization with respect to the cell and detecting physical layer cell identity NcellID of the cell. To this end, the UE perform synchronization with an eNB by receiving synchronization signals, for example, a primary synchronization signal (PSS) and a secondary synchronization signal (SSS) from the eNB and then acquires information such as a cell identifier, etc.

Specifically, 63-length of a Zadoff-Chu (ZC) sequence is defined in the frequency domain according to Formula 3 below so that the PSS obtains time domain synchronization and/or frequency domain synchronization such as OFDM symbol synchronization, slot synchronization, etc.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Formula 1]}$$

In Formula 1 above, u indicates a ZC root sequence index and it is defined in the current LTE system as show in Table 3 below.

TABLE 3

| $N_{ID}^{(2)}$ | Root index u |
|---|---|
| 0 | 25 |
| 1 | 29 |
| 2 | 34 |

Next, the SSS is used to obtain frame synchronization, a cell group ID and/or a CP configuration of the cell (i.e., information on the use of normal CP or extended CP). In addition, the SSS is configured with an interleaved combination of two length-31 binary sequences. That is, the SSS sequences, d(0), . . . , d(61) as total 62-length. Moreover, as shown in Formula 2 below, different SSS sequences are defined according to whether the SSS sequence is transmitted in subframe #0 or subframe #5. In Formula 2, n is an integer between 0 and 30.

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad \text{[Formula 2]}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

More specifically, the synchronization signals are transmitted in the first slot of subframe #0 and the first slot of subframe #5 in consideration of a global system for mobile communication (GSM) frame length of 4.6 ms for facilitation of inter-radio access technology (inter-RAT) measurement. Especially, the PSSs are transmitted in the last OFDM symbol of the first slot of the subframe #0 and in the last OFDM symbol of the first slot of the subframe #5, and the SSSs are transmitted in the second to the last OFDM symbol of the first slot of the subframe #0 and in the second to the last OFDM symbol of the first slot of the subframe #5. That is, a boundary of a corresponding radio frame may be detected through the SSS. The PSS is transmitted from the last OFDM symbol of a corresponding slot and the SSS is transmitted from an OFDM symbol immediately before the OFDM symbol in which the PSS is transmitted.

An SS may represent a total of 504 unique physical layer cell IDs through combinations of 3 PSSs and 168 SSSs. In other words, the physical layer cell IDs are grouped into 168 physical layer cell ID groups, each of which includes three unique IDs so that each physical layer cell ID is a part of only one physical layer cell ID group. Thus, a physical layer cell ID $N^{cell}_{ID}$ is uniquely defined with a number $N^{(1)}_{ID}$ in the range of 0 to 167 indicating a physical layer cell ID group and a number $N^{(2)}_{ID}$ from 0 to 2 indicating a physical layer ID in the physical layer cell ID group. A UE can obtain one of the three unique physical layer IDs by detecting the PSS and then identify one of the 168 physical layer cell IDs associated with the physical layer ID in a manner of detecting the S S S.

Since the PSS is transmitted every 5 ms, the UE may identify that the corresponding subframe is either the subframe #0 or the subframe #5 by detecting the PSS. However, the UE may not exactly identify which one of the subframe #0 and the subframe #5 is the corresponding subframe. Therefore, the UE does not recognize a boundary of the radio frame by using the PSS only. That is, frame synchronization cannot be acquired by the PSS only. The UE detects the boundary of the radio frame by detecting the SSS transmitted twice within one radio frame but transmitted as sequences different from each other.

In this way, for cell search/re-search, the UE may synchronize with the eNB by receiving the PSS and the SSS from the eNB and acquire information such as cell ID (identity). Thereafter, the UE may receive intra-cell broadcast information managed by the eNB on a PBCH.

D2D (Device-to-Device) Communication

For D2D communication introduced in the aforementioned wireless communication system (e.g., 3GPP LTE system or 3GPP LTE-A system), schemes for performing the D2D communication will be described in detail.

First of all, a device-to-device communication environment applicable to the present invention will be described in brief.

The D2D communication refers to communication between an electronic device and another electronic device. In a broad sense, the D2D communication refers to wire or wireless communication between electronic devices or communication between a machine and a device controlled by a user. Recently, the D2D communication may generally mean wireless communication between electronic devices operating without human involvement.

Figure 12:
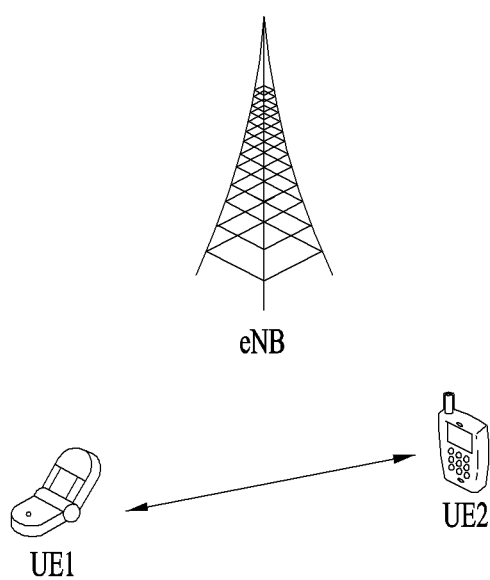
FIG. 12 is a diagram for an example of a communication system applicable to the present invention.

FIG. 12 is a conceptual diagram for explaining D2D communication. In FIG. 12, a device-to-device or UE-to-UE communication scheme is illustrated as an example of the D2D communication. According to this scheme, data can be exchanged between UEs without intervention of an eNB. A direct link established between devices can be referred to as a D2D link or a side link. Compared to the conventional eNB-based communication, the D2D communication has advantages in that latency is reduced and the amount of required resources is small. Here, the UE means a terminal of a user. However, if a network equipment such as an eNB transmits and receives signals according to the communication scheme between UEs, the network equipment can also be considered as the UE.

To perform the D2D communication, two UEs need to synchronize with each other in time and frequency. In general, when the two UEs are in coverage of the eNB, the two UEs synchronize with each other through a PSS/SSS, a CRS, and the like transmitted by the eNB, and time/frequency synchronization can be maintained at such a level that the two UEs can directly transmit and receive signals with each other. In this case, a synchronization signal for the D2D communication is referred to as a D2DSS. The D2DSS may include signals such as the PSS/SSS used in the LTE system. The PSS/SSS (or signals obtained by modifying the PSS/SSS) are respectively referred to as a PD2DSS (primary D2D synchronization signal) and an SD2DSS (secondary D2D synchronization signal). Similar to the PSS of the LTE system, the PD2DSS may be used to obtain an approximate timing and be created based on the ZC sequence. Moreover, similar to the SSS of the LTE system, the SD2DSS may be used for more accurate synchronization and be created based on the m-sequence. A physical D2D synchronization channel (PD2DSCH) means a channel for carrying such information necessary for synchronization as a system bandwidth, a radio frame, a subframe index, and the like.

Meanwhile, a D2D transmission signal transmitted through a sidelink can be mainly divided into a discovery use and a communication use. A discovery signal corresponds to a signal used by a UE to determine a plurality of UEs adjacent to the UE. As an example of a sidelink channel for transmitting and receiving the discovery signal, there is a sidelink discovery channel (PSDCH: Physical Sidelink Discovery Channel). A communication signal corresponds to a signal for transmitting general data (e.g., voice, image information, etc.) to be transmitted by a UE. As an example of a sidelink channel for transmitting and receiving the communication signal, there are a physical sidelink broadcast channel (PSBCH), a physical sidelink shared channel (PSSCH), a physical sidelink control channel (PSCCH), and the like.

In the following, a synchronization signal used in a sidelink proposed in the present invention (hereinafter, a D2DSS or a synchronization signal) is explained.

As mentioned in the foregoing description, a synchronization signal for a sidelink may consist of PSSS and SSSS. The PSSS is generated using a sequence generation method of PSS, but a root index can be generated using a value different from the PSS to distinguish the PSSS from the PSS. Meanwhile, the SSSS is generated using a sequence generation method of SSS, but the number of sequences can be reduced to simplify the implementation.

As mentioned in the foregoing description, a D2D transmission signal transmitted through a sidelink can be mainly divided into a discovery use and a communication use and a discovery signal can be represented as a message including ID information of a transmission UE and the like. Since an operation of discovering a UE via the discovery signal can have relatively long time delay, a resource for transmitting the discovery signal may appear with a relatively long period.

On the contrary, the communication signal corresponds to a signal for transmitting general data (e.g., voice, image information, etc.) to be transmitted by a UE. Since it is necessary to complete transmission of the data in a relatively short time, a resource for transmitting the communication signal may appear with a relatively short period.

In order to receive a D2D signal, a reception UE should be synchronized with a transmission UE. In this case, a synchronization signal can be used. In particular, if the transmission UE transmits a synchronization signal, the reception UE detects the synchronization signal to identify time/frequency synchronization of the discovery signal or the communication signal to appear in the future. However, as mentioned above, since the period of the discovery differs from the period of the communication, it is difficult to obtain synchronization of both signals using the same synchronization signal. For example, if it is assumed that a specific synchronization signal is used for both the discovery signal and the communication signal, the synchronization signal is transmitted with a short period in accordance with the communication signal transmitted with a short period, but an additional synchronization signal transmission may occur at a certain point of time in accordance with the discovery signal transmitted with a long period. As a result, the entire synchronization signal may have an aperiodic form. The aperiodicity may cause a result that the reception UE fails to identify accurate synchronization signal timing.

In the following, in order to solve the above-mentioned problem, a method of distinguishing a synchronization signal according to a usage is explained in the present invention. In particular, an embodiment for distinguishing a synchronization signal according to whether the synchronization signal is used for discovery or communication is mainly described in the following. Yet, the usage is not restricted by the discovery and the communication. The present invention is also applicable to a method for distinguishing a synchronization signal according to other usage. As an example, a D2D signal synchronization reference can be used for distinguishing a signal transmitted from a base station from a signal transmitted from a device outside a network such as a satellite.

<Embodiment 1: Distinguishing Usage using Symbol Position of Synchronization Signal>

Synchronization signals used by a discovery signal and a communication signal can be distinguished using a symbol position. Specifically, a method of distinguishing a usage using a symbol position is explained with reference to FIGS. 13 to 15 in the following. In FIGS. 13 to 15, a normal CP case is illustrated. Yet, it may be able to apply to an extended CP case as well. Referring to FIGS. 13 to 15, 4 synchronization signal symbols are depicted. Yet, it may be able to configure the number of the synchronization signal symbols to be greater than 4 or less than 4. Symbol positions shown in FIGS. 13 to 15 are just an example only and a symbol position to which a synchronization signal is mapped may change in various ways. And, symbol positions shown in FIGS. 13 to 15 are just an example only and the symbol positions of the discovery signal and the communication signal may appear in opposite way.

A synchronization signal symbol consists of a symbol used for PSSS ('P' in FIGS. 13 to 15) and a symbol used for SSSS. In FIGS. 13 to 15, 'P' denotes the symbol used for the PSSS and 'S' denotes the symbol used for the SSSS.

In the following, a synchronization signal for a discovery signal is referred to as a first synchronization signal. PSSS and SSSS for the discovery signal constructing the first synchronization signal are referred to as a first primary synchronization signal and a first secondary synchronization signal, respectively. A synchronization signal for a communication signal is referred to as a second synchronization signal. PSSS and SSSS for the communication signal constructing the second synchronization signal are referred to as a second primary synchronization signal and a second secondary synchronization signal, respectively.

FIG. 13 is a diagram for is a diagram for a method of distinguishing a first synchronization signal from a second synchronization signal using a symbol position according to one embodiment of the present invention.

Referring to FIG. 13, a first synchronization signal and a second synchronization signal, which are respectively used by a discovery signal and a communication signal, are defined to be mapped to a different symbol position to make the first synchronization signal and the second synchronization signal to be identified respectively. FIG. 13 (*a*) is a diagram for the first synchronization signal used for the discovery signal and FIG. 13 (*b*) is a diagram for the second synchronization signal used for the communication signal.

As shown in FIG. 13, the first synchronization signal and the second synchronization signal are defined to be mapped to a different symbol position to identify the signals. In FIG. 13 (*a*), the first synchronization signal includes a first primary synchronization signal and a first secondary synchronization signal. The first primary synchronization signal is mapped to a second symbol and a third symbol of a first slot (if a symbol index of a subframe starts at #0, symbols #1 and #2) and the first secondary synchronization signal is mapped to a fifth symbol and a sixth symbol of a second slot.

On the contrary, in FIG. 13 (b), the second synchronization signal includes a second primary synchronization signal and a second secondary synchronization signal. The second primary synchronization signal is mapped to a fourth symbol and a fifth symbol of a first slot and the second secondary synchronization signal is mapped to a third symbol and a fourth symbol of a second slot.

A UE receives each of the synchronization signals, determines a usage of the signal through a symbol position to which the synchronization signal is mapped, and may be able to obtain synchronization for the discovery signal and/or the communication signal.

In FIG. 13, it is depicted that a symbol to which the first synchronization signal is mapped is not overlapped with a symbol to which the second synchronization signal is mapped. Yet, it may also be able to configure at least one symbol position to be differently mapped only. For example, it may be able to configure the first primary synchronization signal and the second primary synchronization signal to be mapped to the same position and configure the second secondary synchronization signal to be mapped to a symbol position different from a symbol position to which the first secondary synchronization signal is mapped. On the other hand, it may be able to configure the first primary synchronization signal to be mapped to a symbol position different from a symbol position to which the second primary synchronization signal is mapped and configure the first secondary synchronization signal and the second secondary synchronization signal to be mapped to the same symbol position.

Or, it may be able to configure the first symbol to which the first primary synchronization signal and the second primary synchronization signal are mapped to have the same symbol position and configure the second symbol to have a different position. Similarly, it may be able to configure the first symbol to which the first secondary synchronization signal and the second secondary synchronization signal are mapped to have the same symbol position and configure the second symbol to have a different position.

Or, it may be able to configure the second symbol to which the first primary synchronization signal and the second primary synchronization signal are mapped to have the same symbol position and configure the first symbol to have a different position. Similarly, it may be able to configure the second symbol to which the first secondary synchronization signal and the second secondary synchronization signal are mapped to have the same symbol position and configure the first symbol to have a different position.

FIG. 14 is a diagram for a method of distinguishing a first synchronization signal from a second synchronization signal using a symbol position according to a different embodiment of the present invention.

Referring to FIG. 14, symbol positions used by the first synchronization signal and the second synchronization signal are same, but positions of a primary synchronization signal and a secondary synchronization signal may change.

Specifically, a secondary synchronization signal of a communication signal uses a symbol of a primary synchronization signal of a discovery signal and a primary synchronization signal of the communication signal uses a symbol of a secondary synchronization signal of the discovery signal.

In particular, a symbol position to which the second synchronization signal is mapped can be represented as follows. The second secondary synchronization signal is mapped to a symbol position to which the first primary synchronization signal is mapped and the second primary synchronization signal can be mapped to a symbol position to which the first secondary synchronization signal is mapped.

Referring to FIG. 14, in case of the first synchronization signal, the first primary synchronization signal is mapped to a first slot and the first secondary synchronization signal is mapped to a second slot. On the contrary, in case of the second synchronization signal, the second primary synchronization signal is mapped to a symbol position of the first secondary synchronization signal of a second slot and the second secondary synchronization signal is mapped to a symbol position of the first primary synchronization signal of a first slot.

FIG. 15 is a diagram for a method of distinguishing a first synchronization signal from a second synchronization signal using a symbol position according to a further different embodiment of the present invention.

Referring to FIG. 15, although symbol positions used by synchronization signals are same, an order of mapping a primary synchronization signal and a secondary synchronization signal to symbols (4 symbols in FIG. 15) used by synchronization signals may be different.

Referring to FIG. 15, although a first synchronization signal and a second synchronization signal are mapped to the same symbol position, in case of the first synchronization signal, a primary synchronization signal is mapped to two symbols first and then a secondary synchronization signal is mapped to two symbols. On the contrary, in case of the second synchronization signal, a primary synchronization signal and a secondary synchronization signal are alternately mapped. The mapping order of the synchronization signal shown in FIG. 15 is just an example only. The order may change in various ways.

As mentioned in the foregoing description, it may be able to determine whether a synchronization signal is used for a discovery use or a communication use using a symbol position of the synchronization signal. The aforementioned embodiment can also be applied to determine other uses. For example, it is able to determine whether a reference for D2D signal synchronization corresponds to a signal of a base station or a signal transmitted from an external device of a network such as satellite using a symbol position of a synchronization signal. A synchronization signal for each signal can be generated using a different symbol position and a reception UE can determine a usage of a synchronization signal using a symbol position of the synchronization signal.

<Embodiment 2: Distinguishing Usage using Sequence used for Generating Synchronization Signal>

A first synchronization signal for a discovery use can be distinguished from a second synchronization signal for a communication use using a sequence for generating a secondary synchronization signal. A secondary synchronization signal sequence used in the first synchronization signal for the discovery use may differ from a secondary synchronization signal sequence used for the communication use.

A transmission UE can generate a secondary synchronization signal by differently applying the secondary synchronization signal sequence for the discovery use and the secondary synchronization signal sequence for the communication use. A reception UE can distinguish the synchronization signal for the discovery use from the synchronization signal for the communication use using a sequence of a secondary synchronization signal.

As an example, a first secondary synchronization signal (a secondary synchronization signal for discovery) can be generated using a sequence, which is generated according to a scheme of SSS used in a subframe #0 (or #5). On the contrary, a second secondary synchronization signal (a secondary synchronization signal for communication) can be generated using a sequence, which is generated according to a scheme of SSS used in a subframe #5 (or #0).

As a different example, in case of a first secondary synchronization signal, it may use sequences, which are generated according to a scheme of SSS used in subframes #0 and #5 (or #5 and #0), in two symbols in order. In case of a second secondary synchronization signal, it may use sequences, which are generated according to a scheme of SSS used in subframes #5 and #0 (or #0 and #5), in two symbols in order.

As a further different example, parameters for generating sequences of a secondary synchronization signal are divided into two types of sets. One set is used for a synchronization signal usage for discovery and another set can be used for a synchronization signal usage for communication.

As mentioned in the foregoing description, it may be able to determine whether a synchronization signal is used for a discovery use or a communication use using a sequence of the synchronization signal. The aforementioned embodiment can also be applied to determine other uses. For example, it is able to determine whether a reference for D2D signal synchronization corresponds to a signal of a base station or a signal transmitted from an external device of a network such as satellite using a sequence of a synchronization signal. A synchronization signal for each signal can be generated using a different sequence and a reception UE can determine a usage of a synchronization signal using a sequence which is used for generating the synchronization signal.

<Embodiment 3: Distinguishing Usage using Primary Synchronization Signal>

Meanwhile, it may be able to distinguish a synchronization signal for a discovery use from a synchronization signal for a communication use using a primary synchronization signal.

A first synchronization signal for a reception UE belonging to the coverage of a network can be distinguished from a second synchronization signal for a reception UE located at the outside of the coverage using a primary synchronization signal. The second synchronization signal corresponding to a synchronization signal for communication can be divided into a synchronization signal used by a UE belonging to the coverage of the network (hereinafter, D2DSSue_net or second internal synchronization signal) and a synchronization signal used by a UE located at the outside of the coverage of the network (hereinafter, D2DSSue_oon or second external synchronization signal). In this case, the first synchronization signal for discovery may have a common ground with the second internal synchronization signal sharing a characteristic that the second internal synchronization signal is used at the inside of the coverage of the network only.

As an example, the first synchronization signal can be distinguished from the second external synchronization signal using a different primary synchronization signal root index (PSSS root index). The first synchronization signal and the second internal synchronization signal use the same primary synchronization signal root index (PSSS root index). Hence, the first synchronization signal can be distinguished from the second external synchronization signal using a different primary synchronization signal root index in a primary synchronization signal dimension.

The aforementioned embodiment can also be applied to determine other uses. For example, it is able to determine whether a reference for D2D signal synchronization corresponds to a signal of a base station or a signal transmitted from an external device of a network such as satellite.

<Embodiment 4: Distinguishing Usage using Broadcast Channel>

As a characteristic of a synchronization signal for discovery, it may be able to omit PSBCH (physical sidelink broadcast channel) on which additional information for synchronization is delivered in a subframe in which a synchronization signal is transmitted.

This is because, in order to maintain synchronization of a discovery signal transmitted with a long period by a synchronization signal also transmitted with a long period, it is necessary to connect a transmission UE and a reception UE to a network and minimum frequency synchronization should be maintained, various information to be transmitted on PSBCH can be signaled by the network.

In this case, whether or not a specific UE transmits PSBCH together with a synchronization signal can be naturally determined. As an example, if a UE transmits a synchronization signal for discovery, the UE is able to know that the UE does not transmit PSBCH without a separate signaling. On the contrary, if the UE transmits a synchronization signal for communication, the UE can automatically transmit PSBCH together with the synchronization signal.

In the aspect of a reception UE, if a synchronization signal is transmitted without PSBCH, the reception UE is able to determine that the synchronization signal corresponds to a synchronization signal for discovery. If a synchronization signal is transmitted together with PSBCH, the reception UE is able to identify that the synchronization signal corresponds to a synchronization signal for communication.

Similarly, the aforementioned embodiment can be applied to determine other uses. For example, the embodiment can be applied to a method of determining whether a reference for D2D signal synchronization corresponds to a signal of a base station or a signal transmitted from an external device of a network such as satellite.

Meanwhile, in the aforementioned embodiments, it may consider the following.

Although a synchronization signal for discovery and a synchronization signal for communication are transmitted in a manner of being distinguished, if the two synchronization signals are transmitted from a transmission UE belonging to the same cell, a UE of a different cell can receive both a discovery signal and a communication signal in a manner of matching synchronization with either the synchronization signal for discovery or the synchronization signal for communication.

To this end, a network can inform a UE of whether or not the synchronization signal for discovery and the synchronization signal for communication are transmitted from a UE of the same cell. As an example, the network can inform the UE of an ID (identification) of a cell in which the synchronization signal for discovery and the synchronization signal for communication are transmitted, respectively. If a reception UE matches synchronization with either the synchronization signal for discovery or the synchronization signal for communication transmitted from a UE belonging to the same cell, the reception UE can receive both a discovery signal and a communication signal transmitted from the UE of the cell.

As a more general sense, when a plurality of cells are synchronized, the network can inform the reception UE of a synchronization signal for discovery and a synchronization signal for communication transmitted by a UE belong to a set of a plurality of the synchronized cells. If the reception UE matches synchronization with either the synchronization signal for discovery or the synchronization signal for communication transmitted from the UE belonging to the set of the synchronized cells, the reception UE can receive both a discovery signal and a communication signal transmitted from the UE belonging to the set of the cells. If the information is utilized, the reception UE can receive both the discovery signal and the communication signal at the same time using one detected synchronization signal only. By doing so, it may be able to reduce the number of synchronization signals required to be detected to receive a certain number of discovery signals and communication signals.

Meanwhile, the synchronization signal for discovery can be restrictively used only when a UE performs discovery within the coverage of the network. When the UE performs communication at the outside of the coverage, if the UE additionally performs discovery (when a transmission UE is positioned at the inside of the coverage, the transmission UE performs communication and discovery with a UE positioned at the outside of the coverage), it may use a synchronization signal for communication transmitted with a short period to cope with a situation that synchronization is not matched well. In this case, a discovery signal used by the UE positioned at the outside of the coverage can be managed in a manner of being associated with D2DSSue_oon. In particular, it may be able to regulate that the discovery signal is synchronized with a specific communication signal associated with specific D2DSSue_oon.

FIG. 16 illustrates a BS and a UE applicable to an embodiment of the present invention. In a system including a relay, the BS and the UE may be replaced with the relay.

Referring to FIG. 16, a wireless communication system includes the BS 110 and the UE 120. The BS 110 includes a processor 112, a memory 114, and a radio frequency (RF) unit 116. The processor 112 may be configured to implement the procedures and/or methods proposed by the present invention. The memory 114 is connected to the processor 112 and stores various types of information related to operation of the processor 112. The RF unit 116 is connected to the processor 112 and transmits and/or receives radio signals. The UE 120 includes a processor 122, a memory 124, and an RF unit 126. The processor 122 may be configured to implement the procedures and/or methods proposed by the present invention. The memory 124 is connected to the processor 122 and stores various types of information related to operation of the processor 122. The RF unit 126 is connected to the processor 122 and transmits and/or receives radio signals. The BS 110 and/or the UE 120 may have a single antenna or multiple antennas. The above-described embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent on each other may of course be combined to provide an embodiment or new claims can be added through amendment after the application is filed.

In the present disclosure, embodiments of the present invention are described centering on the data transmission/reception relations between a user equipment and a base station. In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. The base station may be replaced with terms such as a fixed station, Node B, eNode B (eNB), and access point. Also, the user equipment may be replaced with terms such as mobile station (MS) and mobile subscriber station (MSS).

The embodiments of the present invention may be implemented using various means. For instance, embodiments of the present invention may be implemented using hardware, firmware, software and/or any combinations thereof. In case of the implementation by hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be driven by a processor. The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although a method of transmitting and receiving a synchronization signal for device-to-device direct communication in a wireless communication system and an apparatus therefor are described with reference to examples applied to 3GPP LTE system, it may be applicable to various kinds of wireless communication systems as well as the 3GPP LTE system.

What is claimed is:
1. A method of transmitting a synchronization signal (SS) including a primary synchronization signal (PSS) and a secondary synchronization signal (SSS) by a user equipment (UE) in a wireless communication system supporting device-to-device (D2D) communication, the method comprising:
    mapping a first SS for a discovery signal to a first subframe and transmitting the first SS; and
    mapping a second SS for a communication signal to a second subframe and transmitting the second SS,
    wherein a first PSS of the first SS is mapped to a symbol having a first index in the first subframe and a first SSS of the first SS is mapped to a symbol having a second index in the first subframe, and wherein a second PSS of the second SS is mapped to a symbol having the second index in the second subframe and a second SSS of the second SS is mapped to a symbol having the first index in the second subframe.

2. The method of claim 1, wherein a mapping order of the first PSS and the first SSS in the first subframe is different from a mapping order of the second PSS and the second SSS in the second subframe.

3. The method of claim 1, wherein the first SSS and the second SSS are generated using a different sequence.

4. A method of receiving a synchronization signal (SS) including a primary synchronization signal (PSS) and a secondary synchronization signal (SSS) by a user equipment (UE) in a wireless communication system supporting device-to-device (D2D) communication, the method comprising:
  obtaining synchronization for a discovery signal by receiving a first SS for the discovery signal mapped to a first subframe; and
  obtaining synchronization for a communication signal by receiving a second SS for the communication signal mapped to a second subframe,
  wherein a first PSS of the first SS is mapped to a symbol having a first index in the first subframe and a first SSS of the first SS is mapped to a symbol having a second index in the first subframe, and
  wherein a second PSS of the second SS is mapped to a symbol having the second index in the second subframe and a second SSS of the second SS is mapped to a symbol having the first index in the second subframe.

5. The method of claim 4 wherein a mapping order of the first PSS and the first SSS in the first subframe is different from a mapping order of the second PSS and the second SSS in the second subframe.

6. The method of claim 4, wherein the first SSS and the second SSS are generated using a different sequence.

7. A user equipment (UE) for transmitting a synchronization signal (SS) including a primary synchronization signal (PSS) and a secondary synchronization signal (SSS) in a wireless communication system supporting device-to-device (D2D) communication, the UE comprising:
  a transceiver configured to perform transmission and reception with a counterpart UE; and
  a processor configured to:
    control the transceiver to map a first SS for a discovery signal to a first subframe and transmit the first SS, and
    control the transceiver to map a second SS for a communication signal to a second subframe and transmit the second SS,
  wherein a first PSS of the first SS is mapped to a symbol having a first index in the first subframe and a first SSS of the first SS is mapped to a symbol having a second index in the first subframe, and
  wherein a second PSS of the second SS is mapped to a symbol having the second index in the second subframe and a second SSS of the second SS is mapped to a symbol having the first index in the second subframe.

8. A user equipment (UE) for receiving a synchronization signal (SS) including a primary synchronization signal (PSS) and a secondary synchronization signal (SSS) in a wireless communication system supporting device-to-device (D2D) communication, the UE comprising:
  a transceiver configured to perform transmission and reception with a counterpart UE; and
  a processor configured to:
    control the transceiver to receive a first SS for a discovery signal mapped to a first subframe to obtain synchronization for the discovery signal based on the first SS, and
    control the transceiver to receive a second SS for a communication signal mapped to a second subframe to obtain synchronization for the communication signal based on the second SS,
  wherein a first PSS of the first SS is mapped to a symbol having a first index in the first subframe and a first SSS of the first SS is mapped to a symbol having a second index in the first subframe, and
  wherein a second PSS of the second SS is mapped to a symbol having the second index in the second subframe and a second SSS of the second SS is mapped to a symbol having the first index in the second subframe.

* * * * *